US006906994B2

(12) United States Patent
Lee et al.

(10) Patent No.: US 6,906,994 B2
(45) Date of Patent: Jun. 14, 2005

(54) DISC HAVING GROOVES AND PITS WITH DIFFERENT DEPTHS, AND METHOD FOR MANUFACTURING THE DISC

(75) Inventors: Kyung-geun Lee, Seongnam (KR); Du-seop Yoon, Suwon (KR); Chang-min Park, Suwon (KR); In-sik Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 998 days.

(21) Appl. No.: 09/810,457

(22) Filed: Mar. 19, 2001

(65) Prior Publication Data

US 2002/0021657 A1 Feb. 21, 2002

(30) Foreign Application Priority Data

Jun. 1, 2000 (KR) ........................................ 2000-30034

(51) Int. Cl.[7] .............................. G11B 7/24; B32B 3/00
(52) U.S. Cl. .................................... 369/275.4; 428/64.4
(58) Field of Search ........................... 369/275.4, 275.3, 369/275.1, 275.2, 279, 277, 278, 13.54, 13.55, 44.26, 53.28, 283, 44.13; 428/64.4, 64.1, 64.3; 430/320, 321

(56) References Cited

U.S. PATENT DOCUMENTS 4,150,398 A 4/1979 Kojima et al.
4,734,904 A 3/1988 Imanaka et al.
5,204,852 A 4/1993 Nakagawa et al.
5,500,850 A 3/1996 Van et al.
5,583,847 A * 12/1996 Takeshima et al. ...... 369/275.4
5,892,752 A * 4/1999 Matsuura ................. 369/275.4
6,054,199 A * 4/2000 Sugiyama et al. ......... 428/64.1
6,226,257 B1 * 5/2001 Morimoto ................ 369/275.4
6,510,129 B1 * 1/2003 Hirokane et al. ........ 369/275.4
6,762,989 B2 * 7/2004 Hirokane et al. ........ 369/275.4

FOREIGN PATENT DOCUMENTS

| | | |
|---|---|---|
| EP | 0 358 276 | 3/1990 |
| EP | 0 546 525 | 6/1993 |
| EP | 0 304 312 | 2/1998 |
| EP | 0 867 869 | 9/1998 |
| JP | 4-177636 | 6/1992 |
| JP | 5-339774 | 12/1993 |
| JP | 7-192273 | 7/1995 |
| JP | 8-7339 | 1/1996 |
| JP | 8-249728 | 9/1996 |
| JP | 9-17029 | 1/1997 |
| JP | 2000-67470 | 3/2000 |
| WO | 97/35304 | 9/1997 |

* cited by examiner

*Primary Examiner*—Ali Neyzari
(74) *Attorney, Agent, or Firm*—Stein, McEwen & Bui, LLP

(57) ABSTRACT

A disc having grooves and pits with different depths according to $$\lambda/8n \leqq d_3 \leqq \lambda/5n$$

where $d_3$ is a difference in depths between the grooves and the pits, $\lambda$ is the wavelength of a light source, and n is the refractive index of the disc. A disc having grooves and pits with different depths can be manufactured without etching by using at least two stampers. Manufacturing a master by depositing photoresist over a glass master, forming a first land region and a second land region having different depths by laser cutting with laser beams having different power levels. Stamping a father stamper having a groove region and a pit region from the master, the shape of the father stamper inverse of the master. Stamping a mother stamper from the father stamper, the shape of the mother stamper inverse of the father stamper. Manufacturing the disc with the mother stamper.

18 Claims, 7 Drawing Sheets

40 14 10 d1 d3 12 15 17 d2

Pw1 23 Pw2 26 28 25 20 d1 d2 18

DISC HAVING GROOVES AND PITS WITH DIFFERENT DEPTHS, AND METHOD FOR MANUFACTURING THE DISC

CROSS REFERENCE TO RELATED APPLICATIONS

This Application claims the benefit of Korean Application No. 00-30034, filed Jun. 1, 2000 in the Korean Patent Office, the disclosure of which is incorporated herein by reference.

BACKGROUND OF THE INVENTION

1. Field of the Invention

The present invention relates to an optical disc having grooves and pits with different depths, and an easy method of manufacturing a disc having grooves and pits with different depths using a stamper obtained by stamping from a master an even number of times.

2. Description of the Related Art

Rewritable, erasable and reproducible optical discs, such as digital versatile disc random access memory (DVD-RAM) and DVD-rewritable (RW), include grooves for recording and/or reproduction. The main difference between DVD-RAM and DVD-RW is in their recording regions. In particular, information can be written to both land and groove regions of a DVD-RAM, and the DVD-RAM has separated addresses formed as pits, such that desired information can be searched throughout the DVD-RAM by such physical units. In contrast, as for the DVD-RW, information can be written to only the groove region, and block addresses, instead of the pits of the DVD-RAM, are formed in the land region (i.e., land pre-pits). However, pits can also be formed in the land region of the DVD-RW when reproduction-only information, i.e., data for copy protection, is required.

The width and depth of the grooves in a DVD-RW are determined for excellent jitter characteristics without pits. An appropriate depth of the DVD-RW grooves is about 20–40 nm, which can be expressed as $\lambda/12n$, using the wavelength ($\lambda$) of a laser beam and the refractive index (n) of the disc. This groove depth of the DVD-RW is smaller than that of DVD-RAM, which is expressed as $\lambda/6n$. In case of the DVD-RW, if pits are formed to have the same depth as that of the grooves at $\lambda/12n$, the following problems occur.

As shown in FIG. 1, the pit depth for the DVD-RW can be determined based on the amplitude ratio of a reproduction signal. Referring to FIG. 1, the amplitude of a reproduction signal from pits was measured with respect to variations of pit depth in units of $\lambda$ at a wavelength of 650 nm, a numerical aperture (NA) of 0.6, and a minimum mark length of 0.42 $\mu$m, and then normalized with respect to a maximum amplitude of a reproduction signal, i.e., at the groove depth of a DVD-RW. The refractive index (n) of the disc is ⅕. When a record mark length is 3T and 14T, the amplitude ratio of each reproduction signal is $m_1$ and $m_2$, which ranges between 0.2 and 0.3, at a pit depth of $\lambda/12n$, i.e., about 0.056 $\lambda$. For a pit depth of $\lambda/4n$, i.e. about 0.167 $\lambda$, the amplitude ratio of the reproduction signal is close to 1 at the point s.

As shown in FIG. 1, when the pit depth is equal to the groove depth at $\lambda/12n$, the signal level is 30% or less of the signal level at the pit depth of $\lambda/4n$. Such a pit signal level from the same pit and groove depth is unreliable. Therefore, a new disc having grooves and pits of different depths would improve pit reproduction signal levels.

A conventional method of manufacturing a disc having grooves and pits having different depths is illustrated in FIGS. 2A through 2H. As shown in FIG. 2A, a photoresist 103 is deposited over a glass master 100 and then exposed to cutting by laser beams having different powers Pw1 and Pw2. After a developing process, a pit region 104 and a groove region 105 having different depths $h_1$ and $h_2$ are obtained, as shown in FIG. 2B. Following this, the glass master 100 with the pit region 104 is etched using $CF_4$ gas (first etching step) such that the pit region 104 become deeper as shown in FIG. 2C.

As shown in FIG. 2D, the groove region 105 is exposed by ashing using $O_3$ gas, and then subjected to etching using $CF_4$ gas (second etching step). As a result, the pit region 104 and the groove regions 105 having different depths are formed, as shown in FIG. 2E. Then, as shown in FIG. 2F, the remaining photoresist 103 is removed by ashing (second ashing) using $O_3$ gas, thereby resulting in a master 106 having the pit region 104 with a depth $s_1$ and the groove region 105 with a depth $s_2$, wherein the depth $s_1$ is larger than the depth $s_2$.

A thin film is deposited over the master 106 with the pit region 104 and the groove region 105 by sputtering, as shown in FIG. 2G. Then, a stamper 110 is stamped from the master 106, wherein the stamper 110 has an inverse shape to that of the master 106, as shown in FIG. 2H. The stamper 110 is used to manufacture a substrate having pits and grooves with different depths by injection molding. Here, the bumps and recessions of the master 106 are printed as recessions and bumps in the stamper 110, and the substrate molded from the stamper 110 has the same shape as the master 106.

According to the conventional disc manufacturing process, the etching is performed twice, so that the entire process is complicated with low yield. Further, because the conventional disc manufacturing process uses only one stamper, the photoresist should be etched. In addition, the manufacturing cost is high.

SUMMARY OF THE INVENTION

To solve the above problems, it is an object of the present invention to provide a new disc using only grooves as recording/reproduction regions and also having a reliable or an optimum signal level from both a pit region, such as a reproduction-only pit region (hereinafter referred to as pits) and the groove regions. In particular, it is an object of the present invention to provide a new disk having grooves and pits of different depths, for example, pits deeper than grooves, thereby improving reproduction signal level of the pits.

Therefore, the present invention can provide, for example, a DVD-RW disc having a reliable or an optimum signal level from both reproduction-only pit regions and groove regions.

It is also an object of the present invention to provide a new method of manufacturing of a disc having pits and grooves of different depths. In particular, it is an object of the present invention to provide a new method of forming grooves and pits having different depths by just cutting using laser beams with different power levels.

Therefore, the present invention provides a new method to manufacture rewriteable discs, such as DVD-RAM and DVD-RW, having grooves and pits with different depths. In particular, the discs can be DVD-RW or DVD-RAM or any other disc requiring grooves and pits of different depths.

Additional objects and advantages of the invention will be set forth in part in the description which follows and, in part, will be obvious from the description, or may be learned by practice of the invention.

The above objectives are attained by providing a disc having grooves and pits with different depths, the grooves having record marks for information recording, the disc comprising a first land having land pre-pits for address signals, the land pre-pits spaced a predetermined distance apart along the track direction of the disc; and a second land having the pits for reproduction-only, wherein the disc satisfies the conditions:

$$\lambda/8n \leqq d_3 \leqq \lambda/5n$$

where $d_3$ is a difference in depths between the grooves and the pits, λ is the wavelength of a light source, and n is the refractive index of the disc.

According to another aspect of the present invention, there is provided a method of manufacturing a disc having grooves and pits with different depths, the method comprising depositing photoresist over a glass master to have a thickness which is the same as the depth of pits of the disc to be manufactured; cutting a portion of the photoresist with a laser beam having a first power level to a depth $d_1$ to form a first land region, cutting a portion of the photoresist with a laser beam having a second power level higher than the first power level to a depth $d_2$ to form a second land, and developing the photoresist which has undergone the cutting of laser, thereby completing a master; stamping a father stamper having a groove region and a pit region from the master, the groove region and the pit region of the father stamper being inverse to those of the master; stamping a mother stamper from the father stamper, the shape of the mother stamper being inverse to the shape of the father stamper; and injection molding a disc substrate from the mother stamper, the disc substrate having grooves and pits corresponding to the groove region and the pit region of the mother stamper, respectively, wherein the depth $d_1$ of each of the grooves and the depth $d_2$ of each of the pits of the substrate are different.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
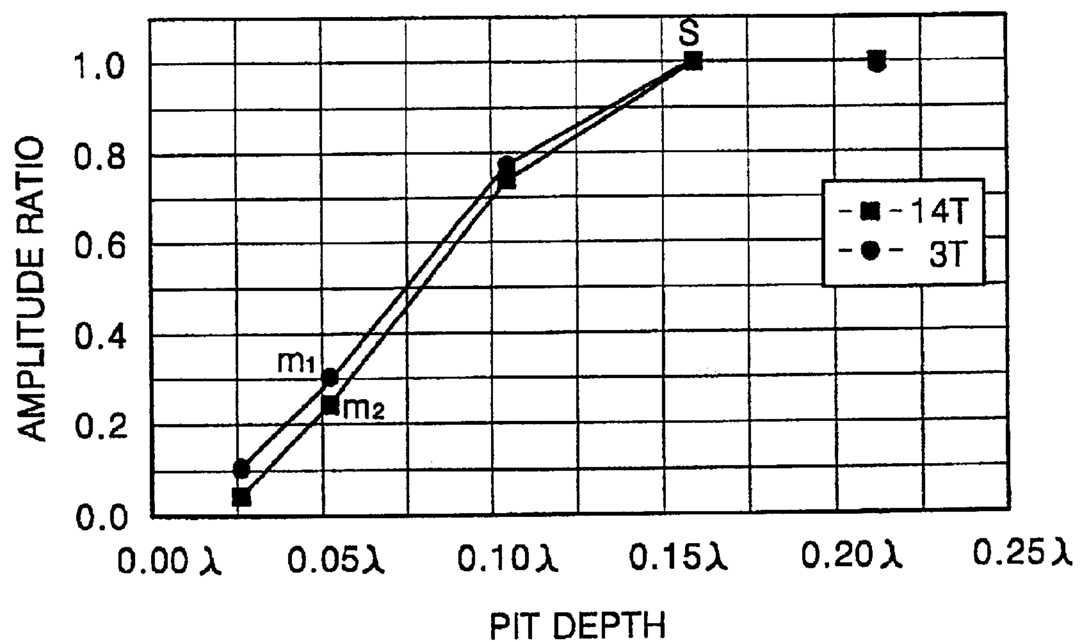
FIG. 1 is a graph illustrating the amplitude ratio of a reproduction signal with respect to the pit depth of a disc.
Figure 2A:
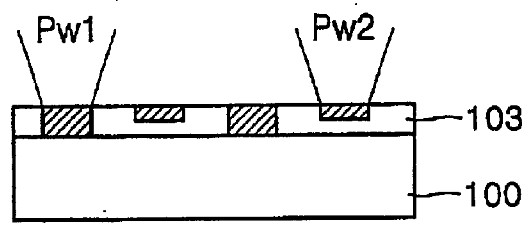
FIGS. 2A through 2H are sectional views illustrating a conventional method for manufacturing a disc having grooves and pits with different depths.
Figure 2B:
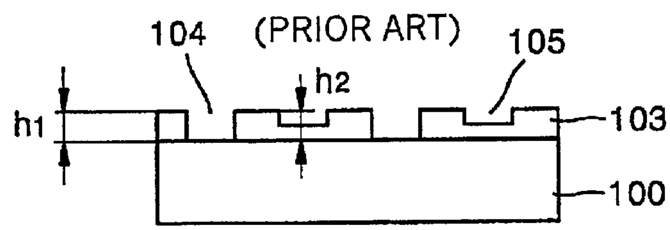
Figure 2C:
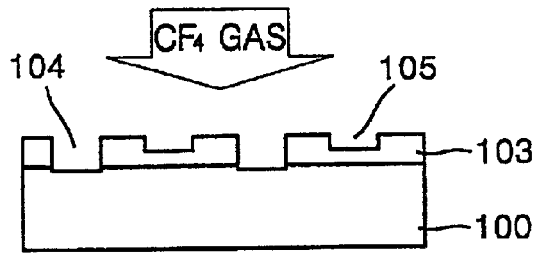
Figure 2D:
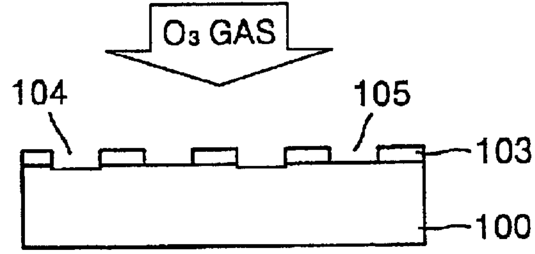
Figure 2E:
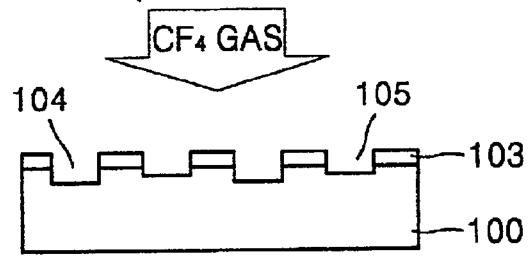
Figure 2F:
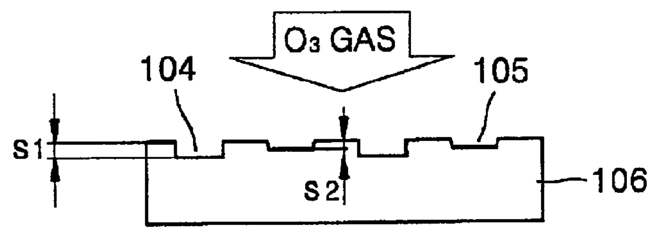
Figure 2G:
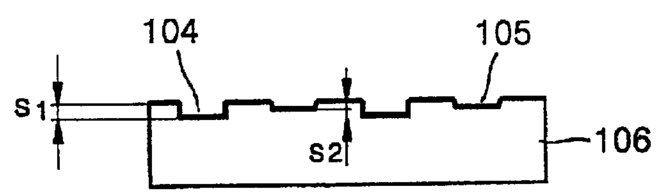
Figure 2H:
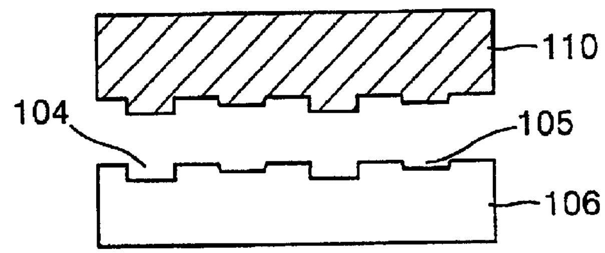

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
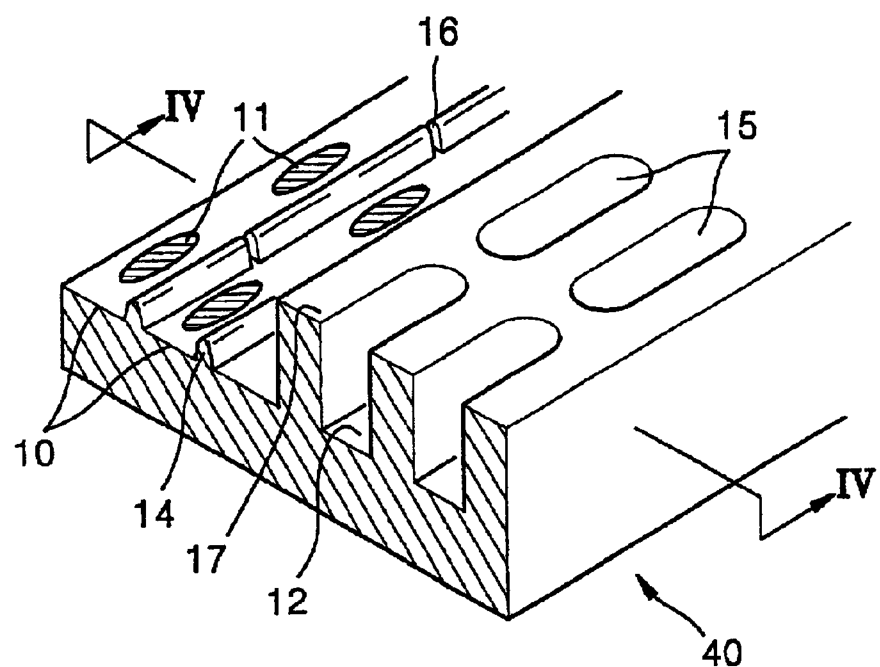
FIG. 3 is a perspective view of a part of an embodiment of a disc having grooves and pits with different depths according to the present invention.
Figure 4:
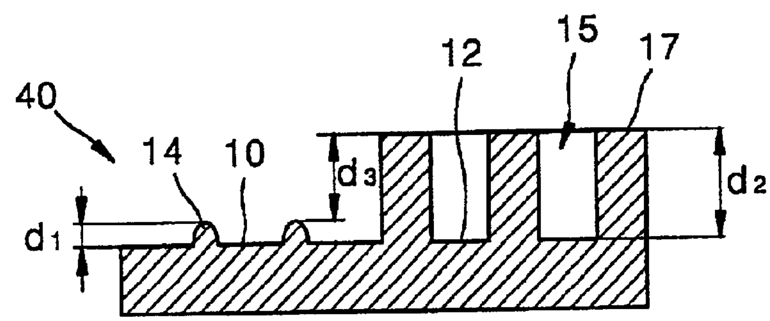
FIG. 4 is a sectional view taken along line IV—IV of FIG. 3.

An embodiment of a DVD-RW disc having grooves and pits with different depths according to the present invention is shown in FIGS. 3 and 4. The disc 40 includes a groove 10 having record marks 11, a first land 14 with land pre-pits 16 for address signals, which are spaced a predetermined distance apart along the track direction of the disc 40, and reproduction-only pits (simply referred to as pits) 15. A region having the pit 15 is referred to as a second land 17.

It is preferable that the groove 10 and the pit 15 both lie on the same base line 12 and the groove 10 and the pit 15 have different depths $d_1$ and $d_2$, respectively. Alternatively, the tops of the first land 14 and the pit 15 both lie on the same line. The depths $d_1$ and $d_2$ of the groove 10 and the pit 15, respectively, are determined such that both a push-pull signal PP for the groove 10 and a reproduction signal for the pit 15 have a reliable level up to a maximum level.

Figure 5:
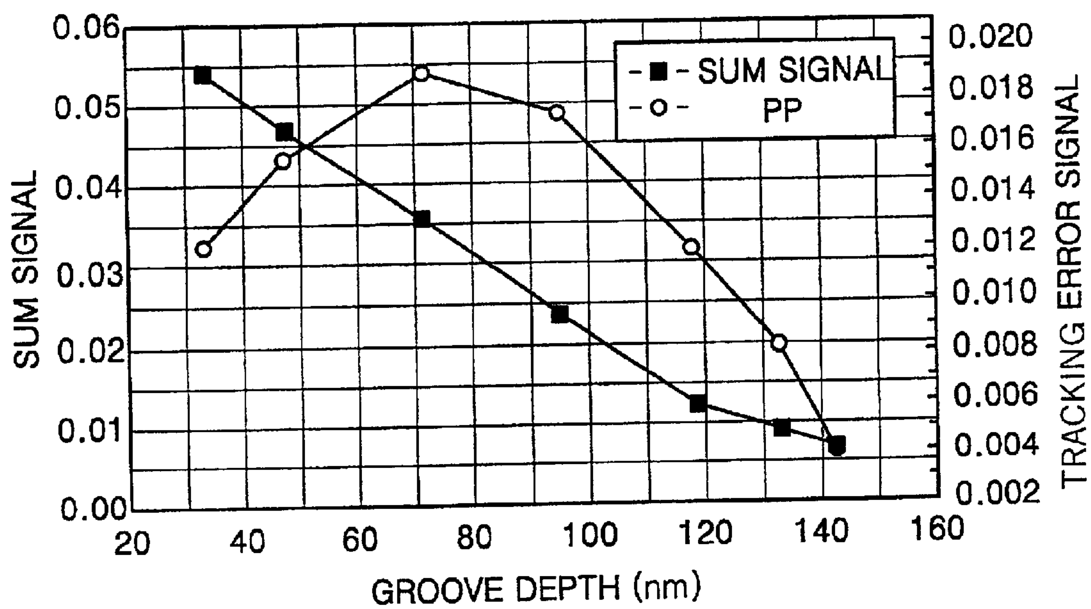
FIG. 5 is a graph illustrating the sum signal level and tracking error signal level with respect to the groove depth.

As shown in FIG. 1, the pit signal has a maximum level at a pit depth of λ/4n or more. A sum signal level and a push-pull signal level (PP) equivalent to a tracking error signal level with respect to the groove depth are shown in FIG. 5. As shown in FIG. 5, the tracking error signal level is maximum at a groove depth of λ/6n, and the sum signal has a maximum level at a groove depth smaller than λ/6n.

The depths of grooves and pits of a disc are determined based on both the sum signal and the tracking error signal using formula (1) below.

$$PPb = \frac{[(I_a + I_b) - (I_c + I_d)]_{ac}}{[I_a + I_b + I_c + I_d]_{dc}} \tag{1}$$

Figure 6:
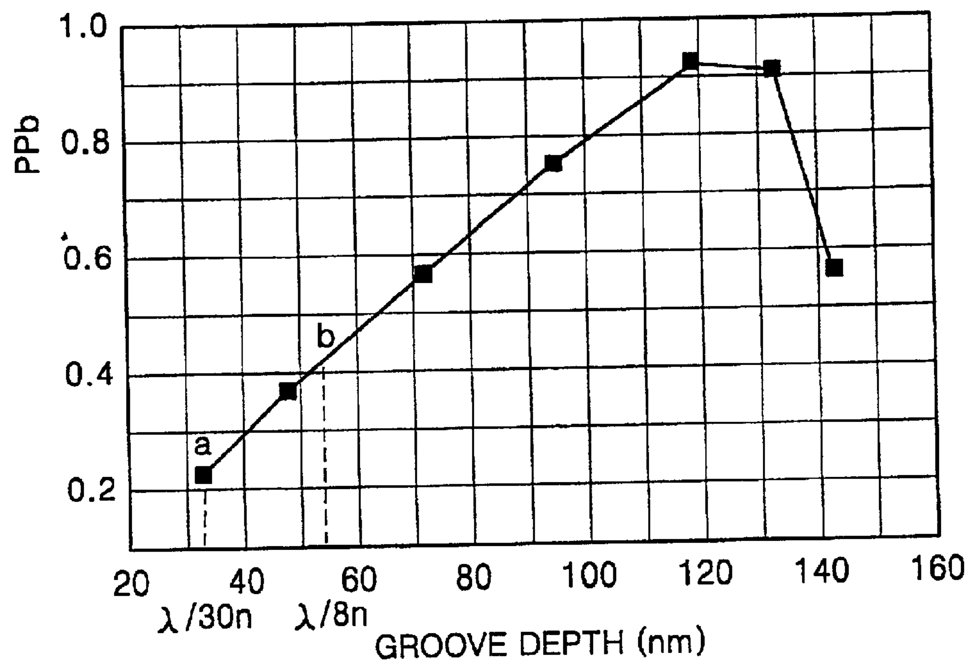
FIG. 6 is a graph illustrating a push-pull signal level before recording, which is obtained from the results of FIG. 5.

In formula (1), "PPb" indicates a push-pull signal before recording, and is expressed as a ratio of the sum signal to the tracking error signal. The push-pull signal before recording PPb was calculated using the results of FIG. 5, and the calculated push-pull signal level before recording PPb is shown in FIG. 6. As shown in FIG. 6, the push-pull signal level is maximum at a groove depth of λ/3.5n which is larger than λ/6n at which the tracking error signal reaches a maximum level. In consideration of record and reproduction characteristics, the push-pull signal level before recording must be in the range of 0.22–0.44 under the DVD-RW specifications in the case of having the pits, as indicated by the points a and b in FIG. 6. Accordingly, the depth $d_1$ of the groove 10 is restricted within the range between points a and b, i.e., in the range of λ/30n–λ/8n and the depth $d_2$ of the pit 15 is λ/4n. This groove-to-pit depth relationship can be generalized using a difference $d_3$ between the depths $d_1$ and $d_2$ as follows:

$$(\lambda/4n-\lambda/30n) \leqq d_3 \leqq (\lambda/4n-\lambda/8n),\ \lambda/8n \leqq d_3 \leqq \lambda/5n. \tag{2}$$

The depth $d_1$ of the groove 10, which satisfies the range of PPb level according to the DVD-RW specifications, can be determined, and then the range of depth $d_2$ of the pit 15 at which quality pit signal up to an optimal pit signal can be output is calculated using formula (2). In particular, a range of reliable or quality pit signals can be calculated by determining the depth $d_1$ of the groove 10, which satisfies the range of PPb level according to applicable DVD-RW specifications, and then the range of depth $d_2$ of the pit 15 at which the quality pit signal up to the optimal pit signal can be output is calculated using formula (3).

$$(\text{MaxPD}-\text{MinGD}) \leqq d_3 \leqq (\text{MaxPD}-\text{MaxGD}) \quad (3)$$

In formula (3), MaxPD indicates a pit 15 depth at which a pit signal has a maximum level, MinGD indicates a minimum groove 10 depth under the DWD-RW specification and MaxGD indicates a maximum groove 10 depth under the DWD-RW specification. Formula (3) can, for example, also apply to DVD-RAM discs.

Figure 7A:
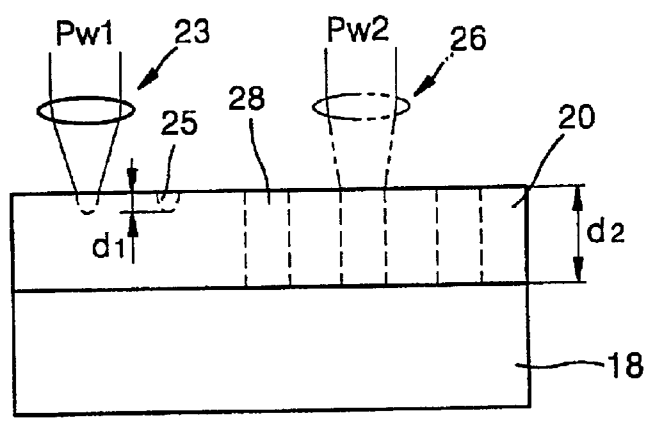
FIGS. 7A through 7E are sectional views illustrating a method of manufacturing a disc having grooves and pits with different depths.

In order to manufacture a disc having grooves and pits having different depths according to the present invention, photoresist 20 is initially deposited over a master glass 18 to have the thickness $d_2$, which is equal to the depth $d_2$ of the pit 15, as shown in FIG. 7A. A first land region 25 of the photoresist 20 is cut to a depth $d_1$ by radiation of a laser beam 23 with a first power level, and a second land region 28 is cut to a depth $d_2$ by a laser beam 26 with a second level higher than the first power level. The first land region 25 and the second land region 28 will become the first land 14 and the second land 17, respectively, of the disc 40 described previously.

When the photoresist 20 is irradiated with a laser beam at the first time, tracks are formed in the opposite direction to the spiral direction of a target disc. This is because stamping from a master for the target disc is performed an even number of times, and then the last stamper among the resulting even number of stampers is used to manufacture the target disk.

Figure 7B:
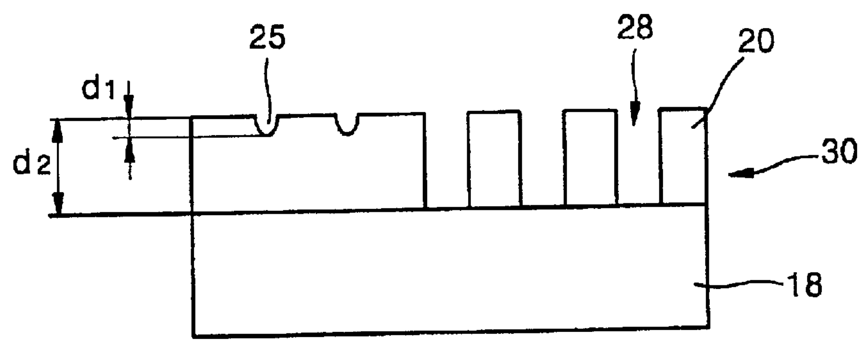
Figure 7C:
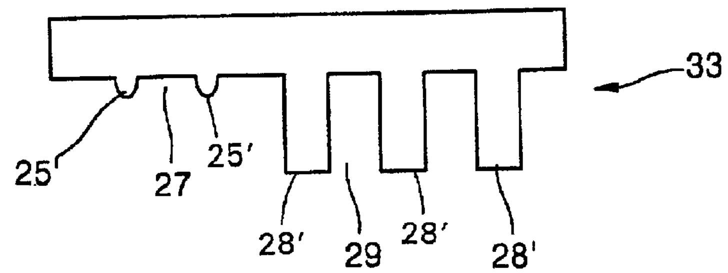

After the laser cutting of the photoresist 20 is completed, the photoresist 20 is developed, so that a master having the first land region 25 with the depth $d_1$ and the second land region 28 with the depth $d_2$ is completed, as shown in FIG. 7B. Following this, a father stamper 33 is stamped from the master 30, as shown in FIG. 7C. Accordingly, the father stamper 33 has an inverse shape to that of the master 30. In other words, a first land region 25' projects and a groove region 27 results in between raised first land regions 25'. A second land region 28' projects and a pit region 29 results in between raised second land regions 28'.

Figure 7D:
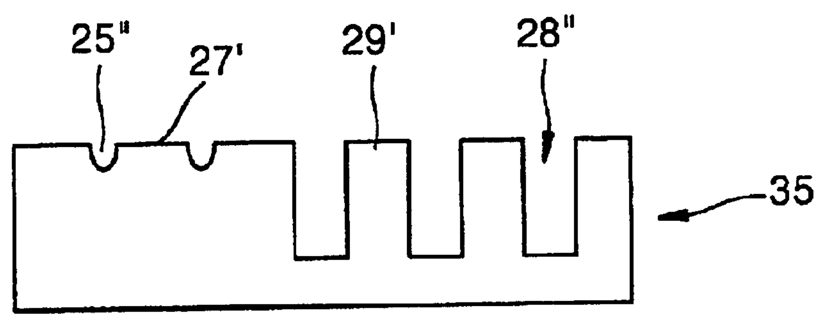
Figure 7E:
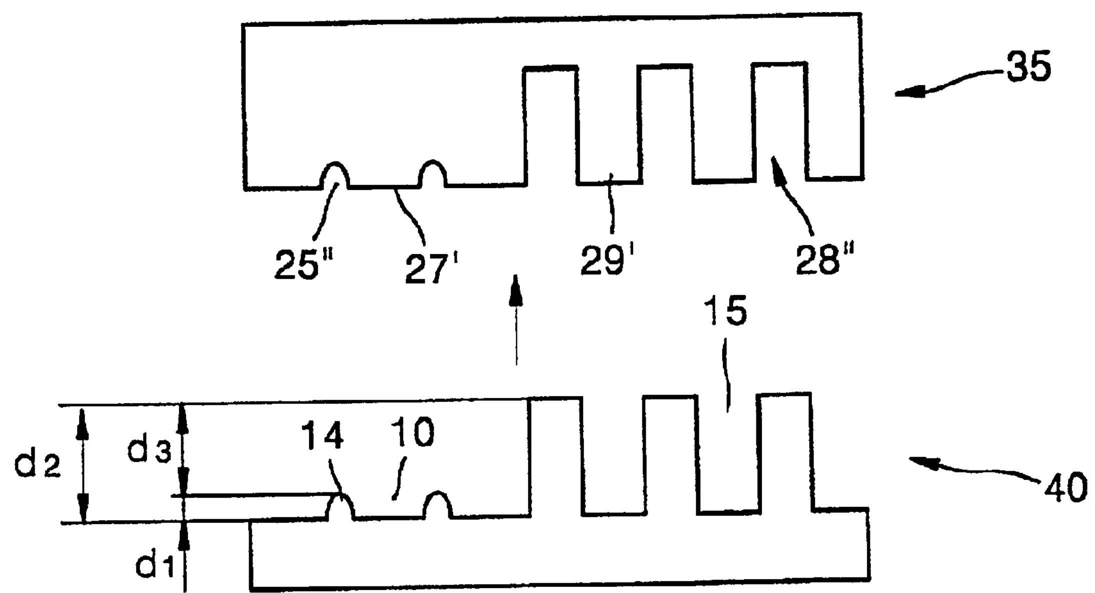

Following this, a mother stamper 35, which has an inverse shape to that of the father stamper 33, but the same as the master 30, is stamped from the father master 33. In particular, as shown in FIG. 7D, the mother stamper 35 has a first land region 25", a second land region 28", a groove region 27' and a pit region 29', which have inverse shapes to those of the corresponding regions of the father stamper 33.

In manufacturing a stamper for use in injection molding a disc substrate, many disc substrates can be simultaneously manufactured using a plurality of stampers. In this way, if the plurality of stampers are stamped from the master 30, the photoresist 20 of the master 30, which is made into contact with each stamper, is possibly worn away, so that stampers with undesired shape can result. According to the present invention, a plurality of mother stampers 35 are stamped using the father stamper 33, thereby preserving the shape of master 30 by reducing wear on the master 30. Then, the mother stampers 35 are used in forming a disc 40 by injection molding.

As described above, when a disc is manufactured by injection molding using two stampers, i.e., the farther stamper 33 and the mother stamper 35, as in the inventive disc manufacturing method, the father stamper 33 has the same pattern as that of the target disc 40 being molded, and the mother stamper 35 has the same pattern as that of the master 30. Thus, the pattern of the master 30 is inverse to that of the target disc 40. For this reason, unless on the photoresist 20 for the master 30 tracks are formed in the opposite direction to the spiral track of a target disc during the initial laser radiation, the target disc having a desired spiral track cannot be manufactured.

When a photoresist is irradiated with a laser beam to form a master, a predetermined period of wobbles, which serve as address signals, are formed in the first land region 25 of the photoresist 20. Accordingly, the wobbling frequencies of the groove regions 27 and 27' may vary and the carrier-to-noise (C/N) ratio of wobble signals may deteriorate.

These problems can be prevented if the wobbling frequency of the first land regions 25, 25' and 25" can be coincided with that of the groove regions 27 and 27' by wobbling the first land regions 25, 25' and 25" and the groove regions 27 and 27' such that they have the same phase. The wobbling frequencies and C/N of wobble signals in the groove 10 and the first land 14 (see FIG. 4) were measured for a DVD-RW manufactured by the inventive method so as to check if the DVD-RW has problems. The results are shown in Table 1.

TABLE 1

| | Groove | First land | Difference |
|---|---|---|---|
| Frequency | 141.6 KHz | 141.6 KHz | no difference |
| C/N (CL/NL) | 38.3 dB (−26.0 dBm/ −64.3 dBm) | 37.0 dB (−27.3 dBm/ −64.3 dBm) | 1.3 dB |

As shown in Table 1, there can be no difference in wobbling frequencies between the groove 10 and the first land 14. The difference in C/N between the groove 10 and the first land 14 is about 1.3 dB, which can be acceptable. The C/N in each of the groove 10 and the first land 14 is closed to 35 dB which is the standard requirement. In conclusion, the inventive disk manufacturing method causes few or no problems in wobble characteristics.

Another advantage of the inventive disc manufacturing method lies in that land pre-pits (LPPs) 16 spaced a predetermined distance apart along the track direction of the disc can be easily formed. In particular, in forming the LPPs 16 over the photoresist 20 with the cutting laser of a laser beam having a first power, the LPPs 16 can be easily formed by momentarily turning the laser off on a land pre-pit region (not shown) which will become the LPPs. Unlike a conventional method which needs additional cutting of laser to the first land 14 for the LPPs, the manufacturing process of the present invention is simplified.

As previously described, in the disc having grooves and pits with different depths according to the present invention, the depth of pits for reproduction-only, can be determined according to the PPb signal level which complies with the current DVD-RW specifications, such that the pit depth differs from the groove depth.

In addition, in the manufacture of a disc having grooves and pits with different depths according to the present invention, stampers are manufactured through an even number of stamping processes. Therefore, a disc, which complies with the current specification, can be manufactured using the even-number stamper and the disc can be manufactured without etching processes. The etching process can be obviated because according to the present invention discs are manufactured by at least two stampers, that is, a father stamper and a mother stamper. Land pre-pits can be formed by just turning the laser off, without any need for a separate laser cutting. Further, reproduction-only pits for a DVD-RW can be formed without etching. As a result, the entire manufacturing process can be simplified at low cost.

While this invention has been particularly shown and described with reference to preferred embodiments thereof, it will be understood by those skilled in the art that various changes in form and details may be made to the described embodiments without departing from the spirit and scope of the invention as defined by the appended claims.

What is claimed is:

1. A disc having grooves and pits with different depths, the grooves with record marks for information recording, the disc comprising:

a first land having land pre-pits for address signals, the land pre-pits spaced a predetermined distance apart along a track direction of the disc; and a second land having the pits for reproduction-only, wherein the disc satisfies the conditions:

$$\lambda/8n \leqq d_3 \leqq \lambda/5n$$

where $d_3$ is a difference in depths between the grooves and the pits, $\lambda$ is a wavelength of a light source to access the disc, and n is the refractive index of the disc.

2. The disc of claim 1, wherein the grooves and the pits lie on the same base line, and the depth of the grooves is different to that of the pits.

3. The disc of claim 2, wherein the grooves have a depth at which a push-pull signal before recording (PPb) ranges from 0.22 to 0.44.

4. The disc of claim 1, wherein the grooves have a depth at which a push-pull signal before recording (PPb) ranges from 0.22 to 0.44.

5. A method of manufacturing a disc having grooves and pits with different depths, the method comprising:

depositing photoresist over a glass master to have a thickness which is the same as the depth of the pits of the disc to be manufactured;

cutting a first portion of the photoresist with a laser beam having a first power level to a depth $d_1$ to form a first land region, cutting a second portion of the photoresist with a laser beam having a second power level higher than the first power level to a depth $d_2$ to form a second land region, and developing the photoresist which has undergone the cutting of laser, thereby completing a master;

stamping a father stamper having a groove region and a pit region from the master, the groove region and the pit region of the father stamper being inverse to those of the master;

stamping a mother stamper from the father stamper, a shape of the mother stamper being inverse to a shape of the father stamper; and injection molding the disc from the mother stamper, the disc having the grooves and the pits corresponding to the groove region and the pit region of the mother stamper, respectively, wherein the depth di of each of the grooves and the depth $d_2$ of each of the pits of the disc are different.

6. The method of claim 5, wherein the grooves and the pits lie on the same base line, and the depth of the grooves is different to that of the pits.

7. The method of claim 6, wherein the grooves have a depth at which a push-pull signal before recording (PPb) ranges from 0.22 to 0.44.

8. The method of claim 5, further comprising turning the laser beam having the first power level off when cutting the first land region to form a land pre-pit region of the master which is to be used to form a land pre-pit in the disc.

9. The method of claim 5, wherein the grooves have a depth at which a push-pull signal before recording (PPb) ranges from 0.22 to 0.44.

10. A disc, comprising:

grooves with record marks to record information;

a first land having land pre-pits for address signals, the land pre-pits spaced a predetermined distance apart along a track direction of the disc; and a second land having reproduction-only pits, wherein the disc satisfies the condition:

$$(\text{MaxPD}-\text{MinGD}) \leqq d_3 \leqq (\text{MaxPD}-\text{MaxGD})$$

where $d_3$ is a difference in depths between the grooves and the pits, MaxPD indicates a pit depth at which a pit signal has a maximum level, MinGD indicates a minimum groove depth under a disc specification for the disc and MaxGD indicates a maximum groove depth under the disc specification.

11. The disc according to claim 10, wherein the grooves and the pits both lie on a same base line and the grooves and the pits have different depths $d_1$ and $d_2$, respectively.

12. The disc according to claim 10, wherein tops of the first land and the pits both lie on a same line and the grooves and the pits have different depths $d_1$ and $d_2$, respectively.

13. A disc manufacturing method, comprising:

depositing photoresist over a glass master to have a thickness same as depth of pits of the disc to be manufactured;

cutting the photoresist using a laser beam having a first power level to form a first land region and cutting the photoresist using a laser beam having a second power level higher than the first power level to form a second land region, depth of the second land region being same as the thickness of the photoresist; and stamping from the master a disc having grooves and pits corresponding to the first land region and the second land region, respectively, the grooves and the pits lying on a same base line and having different depths.

14. The method of claim 13, wherein tracks on the master are formed in opposite direction to spiral direction of the disc with a laser beam, and the method further comprising:

stamping a father stamper having grooves and pits from the master, the grooves and the pits of the father stamper formed by the first land region and the second land region of the master, respectively, by being inverse of the first land region and the second land region of the master;

stamping a mother stamper having grooves and pits from the father stamper, the grooves and the pits of the mother stamper being inverse to those of the father stamper; and injection molding the disc from the mother stamper, the disc having grooves and pits corresponding to the grooves and the pits of the mother stamper, respectively.

15. The method of claim 13, further comprising:

wobbling the first land region of the master and wobbling land regions of the father and the mother stampers, the land regions of the father and the mother stampers corresponding to the first land region of the master; and wobbling the grooves of the father and mother stampers to have substantially the same phase as the land regions of the master, the father and the mother stampers.

16. A method of manufacturing discs, comprising:

depositing a photoresist over a glass master to have a thickness same as a depth of pits of the discs to be manufactured;

cutting the photoresist to form a master using laser beams with different power levels to form grooves and the pits, the grooves and the pits having different depths;

stamping from the master a father stamper having grooves and pits, the grooves and the pits of the father stamper being inverse to those of the master;

stamping mother stampers from the father stamper, the mother stampers being the same shape as the master; and stamping discs having grooves and pits with different depths and lying on same baseline from the mother stampers.

17. A method of manufacturing discs, comprising:

depositing a photoresist over a glass master to have a thickness same as a depth of pits of a disc;

cutting the photoresist to form a master using laser beams with different power levels to form grooves and the pits, the grooves and the pits having different depths; and forming the discs with an even-number stamper from the master.

18. A method of forming a master to produce a disc, comprising:

depositing photoresist over a glass master to have thickness same as depth of pits of a disc stamped from the master; and cutting the photoresist using a laser beam having a first power level to form a first land region and cutting the photoresist using a laser beam having a second power level higher than the first power level to form a second land region, depth of the second land region being same as the thickness of the photoresist, to form the master.

* * * * *

UNITED STATES PATENT AND TRADEMARK OFFICE

CERTIFICATE OF CORRECTION

PATENT NO. : 6,906,994 B2
DATED : June 14, 2005
INVENTOR(S) : Kyung-geun Lee et al.

It is certified that error appears in the above-identified patent and that said Letters Patent is hereby corrected as shown below:

Column 7,
Line 51, change "di" to -- $d_1$ --.

Signed and Sealed this

Sixth Day of September, 2005

JON W. DUDAS
*Director of the United States Patent and Trademark Office*